(12) United States Patent
Gottschalk

(10) Patent No.: US 7,360,773 B2
(45) Date of Patent: Apr. 22, 2008

(54) SELF-STEERING AXLE SUSPENSION SYSTEM HAVING A ROTARY STABILIZER

(75) Inventor: Michael J. Gottschalk, Newark, OH (US)

(73) Assignee: Hendrickson USA, L.L.C., Itasca, IL (US)

( * ) Notice: Subject to any disclaimer, the term of this patent is extended or adjusted under 35 U.S.C. 154(b) by 0 days.

(21) Appl. No.: 11/459,212

(22) Filed: Jul. 21, 2006

(65) Prior Publication Data

US 2008/0018070 A1    Jan. 24, 2008

(51) Int. Cl.
*B60D 61/12* (2006.01)
(52) U.S. Cl. .............. 280/86.5; 280/93.512; 188/290
(58) Field of Classification Search ......... 280/86.5, 280/93.512, 89.11, 89.12, 89.13, 89, 89.1, 280/90, 81.6; 188/290, 268
See application file for complete search history.

(56) References Cited

U.S. PATENT DOCUMENTS

| | | |
|---|---|---|
| 1,775,624 A | 9/1930 | Shutts |
| 1,918,445 A | 7/1933 | Baits |
| 2,661,915 A | 12/1953 | O'Connor |
| 2,746,768 A | 2/1956 | Bowser |
| 2,854,100 A | 9/1958 | Bowser et al. |
| 2,955,841 A | 10/1960 | Faiver et al. |
| 3,414,287 A | 12/1968 | Weiertz |
| 3,446,513 A | 5/1969 | Weiertz |
| 3,806,150 A | 4/1974 | Peart et al. |
| 4,084,833 A | 4/1978 | Mohrbacker et al. |
| 4,352,509 A | 10/1982 | Paton et al. |
| 4,373,738 A | 2/1983 | Lange |
| 4,411,341 A * | 10/1983 | Schultz .................. 188/310 |
| 4,432,254 A | 2/1984 | Schultz |
| 5,005,859 A * | 4/1991 | Satoh et al. ......... 280/124.13 |
| 5,064,033 A | 11/1991 | Koike et al. |
| 5,074,581 A * | 12/1991 | Matsuoka ............ 280/124.13 |
| 5,305,858 A * | 4/1994 | Haga et al. ............. 188/271 |
| 5,364,113 A | 11/1994 | Goertzen |
| 5,403,031 A | 4/1995 | Gottschalk et al. |
| 5,577,761 A | 11/1996 | Tabata |
| 5,620,194 A | 4/1997 | Keeler et al. |
| 6,293,570 B1 * | 9/2001 | Gottschalk et al. .... 280/86.751 |
| 6,318,522 B1 * | 11/2001 | Johnston et al. ......... 188/267.2 |
| 6,341,677 B1 | 1/2002 | Oliver et al. |
| 6,364,078 B1 | 4/2002 | Parison et al. |
| 6,439,586 B1 | 8/2002 | Eckelberry |
| 6,547,268 B2 | 4/2003 | Yamamoto et al. |
| 6,568,697 B1 | 5/2003 | Brill et al. |
| 6,616,162 B2 | 9/2003 | Machens et al. |
| 6,817,265 B2 | 11/2004 | Hasegawa et al. |
| 6,824,153 B2 | 11/2004 | Hanawa et al. |
| 6,899,208 B2 * | 5/2005 | VanValkenburgh et al. . 188/309 |
| 7,066,308 B2 * | 6/2006 | Kanno et al. ............ 188/290 |
| 2004/0201193 A1 | 10/2004 | Larson et al. |
| 2005/0098964 A1 | 5/2005 | Brown |

* cited by examiner

*Primary Examiner*—Paul N. Dickson
*Assistant Examiner*—Robert A. Coker
(74) *Attorney, Agent, or Firm*—Cook, Alex, McFarron, Manzo, Cummings, Mehler, Ltd.

(57) ABSTRACT

A self-steering axle suspension system utilizing a rotary damper coaxially aligned with and acting directly about the king pin centerline on one side of the vehicle is disclosed. When used as such, the rotary damper constitutes a rotary stabilizer. The rotary stabilizer is used to control the steerability of the self-steering axle suspension system and has a self-centering axle mechanism incorporated therein.

31 Claims, 6 Drawing Sheets

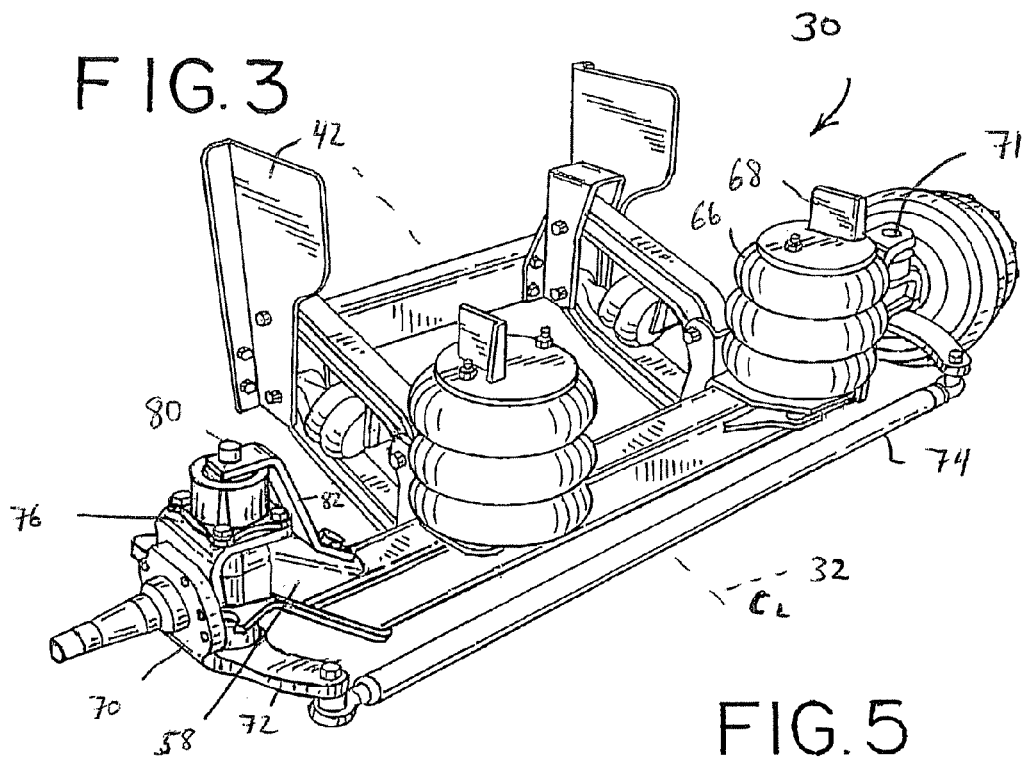

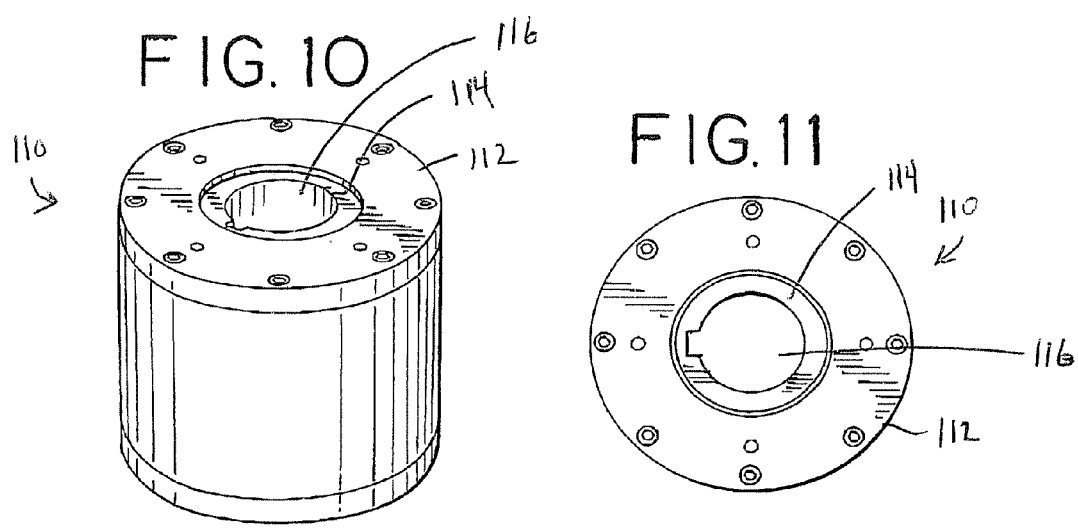
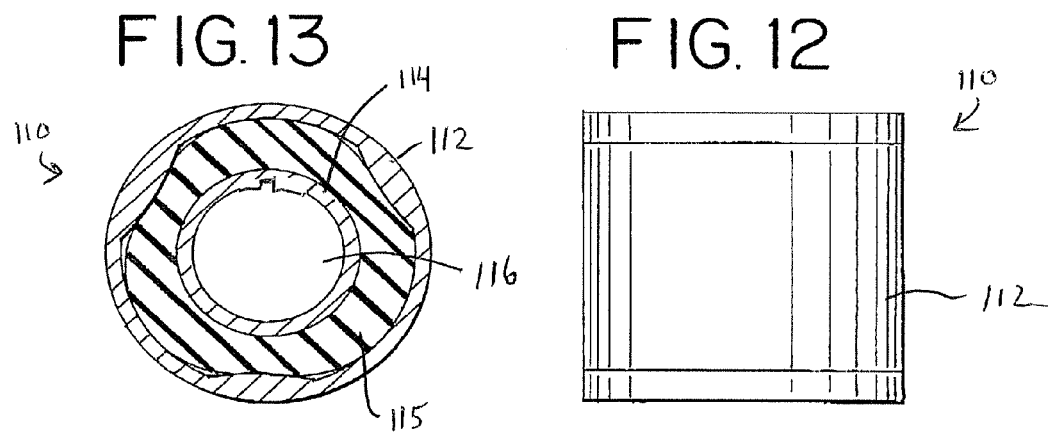

SELF-STEERING AXLE SUSPENSION SYSTEM HAVING A ROTARY STABILIZER

BACKGROUND OF THE INVENTION

The present invention relates generally to stabilizers used in self-steering axle suspension systems for wheeled vehicles. More particularly, the present invention relates to a rotary damper used as a stabilizer in self-steering axle suspension systems for wheeled vehicles to suppress oscillations during travel of the vehicle and to control the steerability of the self-steering axle suspension system.

Self-steering axle suspension systems in the medium and heavy duty truck and semi-trailer industry are known. Typically, such suspensions are made self-steering by adjusting the pitch or caster angle of the wheels so that the drag of the wheels as the vehicle proceeds in the forward direction causes the suspension (including the wheels of the system) to steer automatically in response to steering of the (typically front) steering axle of the vehicle and in response to steering created by other vehicle motion such as vehicle cornering (i.e., as the vehicle goes into a turn). Typical of self-steering axle suspension systems are those referred to as pusher, tag or trailing axles found on trucks and semi-trailers. They may be of the liftable or non-liftable type.

In most self-steering axle suspensions in common use, a pair of dampers is used to suppress (dampen) oscillations during automatic steering at the self-steering axle resulting from travel of the vehicle. Typically, such dampers are in the form of conventional shock absorbers either with, or without, an external auxiliary coil spring. Such devices are often referred to as stabilizers for the self-steering axle suspension systems and they control the steerability of the suspension. In such a damper, a cylinder is provided which houses a fluid reservoir that is almost completely filled with an incompressible hydraulic fluid. This cylinder is separated into two chambers by a piston having an orifice, or orifices, in its head, thus to form a flow path between the two chambers, but which otherwise seals the two chambers against fluid flow therebetween. Dampening is accomplished by attaching one end of the stabilizer (usually by a piston rod connected to the piston head) to one of the components of the steering assembly of the suspension and the other end of the stabilizer to the axle beam structure of the suspension or vehicle. Since the orifice(s) in the piston head restricts flow between the two chambers as the piston slides in the cylinder due to oscillations experienced during vehicle operation (e.g. road shocks and wheel shimmy), such oscillations are appropriately dampened and tracking is stabilized.

FIG. 1 illustrates a conventional self-steering axle suspension system generally designated by reference numeral 10. Conventional self-steering axle suspension system 10 includes linear stabilizers generally designated 12, 14. Stabilizers 12, 14 are in the form of a pair of laterally extending shock absorbers 16, 18 having auxiliary coil springs 20, 22. Stabilizers 12, 14 are each mounted, at one end, to a bracket, which in turn, is mounted to a laterally extending axle beam and, at another end, to a steering assembly component such as the steering arm of the steering knuckle (as shown). Stabilizers 12, 14 supress steering oscillations during road travel of the vehicle and control the steerability of the self-steering axle suspension system 10. The coil springs 20, 22 provide a self-centering feature in known manner. Stabilizers 12, 14 are positioned in opposite orientations such that they are mirrored about the vehicle centerline in order to control the steering action and self-centering in both directions for the vehicle.

Linear stabilizers, such as those illustrated in FIG. 1 as reference numerals 12, 14 are relatively heavy, expensive, bulky and require high maintenance. With regard to the latter drawback, linear stabilizers are subject to damage due to road debris and the like. For this reason, enclosed housing designs have been implemented; however, such designs have only reduced but have not eliminated the maintenance required for linear stabilizers. In addition, maintenance operations, especially out in the field, are cumbersome and correspondingly difficult and time consuming.

In view of the foregoing, there is a need for a relatively lightweight self-steering axle suspension system stabilizer. There is also a need for a relatively inexpensive self-steering axle suspension system stabilizer. Further, there is a need for a relatively compact self-steering axle suspension system stabilizer. Moreover, there is a need for a self-steering axle suspension system stabilizer that requires little maintenance and is relatively easy to maintain.

BRIEF SUMMARY OF THE INVENTION

The present invention is directed to a self-steering axle suspension system utilizing a rotary damper acting directly about the king pin centerline on one side of the vehicle in a manner such that the rotary damper constitutes a rotary stabilizer. The rotary stabilizer is coaxially aligned with the king pin centerline. The rotary stabilizer is used to control the steerability of the self-steering axle suspension system. The rotary stabilizer may also have a self-centering axle mechanism incorporated therein. The present invention is also directed to a rotary stabilizer component used in a self-steering axle suspension system.

A rotary stabilizer designed in accordance with the principles of the present invention and used in a self-steering axle suspension system is preferably relatively lightweight, translating into increased payload capacity and more readily permitting compliance with relevant bridge weight and stress laws and regulations. The stabilizer is preferably relatively inexpensive, having fewer components than conventional stabilizers used in self-steering axle suspension systems. In addition, only a single stabilizer is required for control of the steerability of the suspension system in both steering directions. The stabilizer is preferably compact, fitting tight in relation to the axle or axle beam and acting directly about the king pin centerline. The stabilizer is preferably relatively low maintenance insofar as it includes a fully-enclosed housing and it is mounted above the axle in a position where it is less likely to be subjected to road debris and the like. Maintenance of the stabilizer is also relatively easy, as it is positioned above the king pin centerline in coaxial relationship therewith and is positioned above the axle or axle beam, permitting its relatively simple installation, removal and replacement. The stabilizer preferably includes material that resists velocity motion and the accompanying oscillations that would otherwise occur during road travel of the vehicle. The stabilizer also preferably includes material that provides for self-centering of the self-steering axle suspension system.

BRIEF DESCRIPTION OF THE SEVERAL VIEWS OF THE DRAWING

Reference has been and will frequently be made to the following figures, in which like reference numerals refer to like components, and in which:

FIG. 3 is a perspective view of the self-steering liftable axle suspension system shown in FIGS. 2A and 2B and shown as being designed in accordance with the principles of the present invention;

FIG. 4 is a perspective view of a rotary stabilizer designed in accordance with the principles of the present invention and being designed for use in a self-steering axle suspension system;

FIG. 5 is another perspective view of the rotary stabilizer shown in FIG. 4 being partially cut away to illustrate internal features thereof;

FIG. 10 is perspective view of the rotary stabilizer shown in FIG. 8;

FIG. 11 is a top plan view of the rotary stabilizer shown in FIG. 8;

FIG. 12 is an elevational view of the rotary stabilizer shown in FIG. 8; and

FIG. 13 is a horizontal sectional view of the rotary stabilizer shown in FIG. 8 showing the interior of the housing thereof.

DETAILED DESCRIPTION OF THE INVENTION

Figure 1:
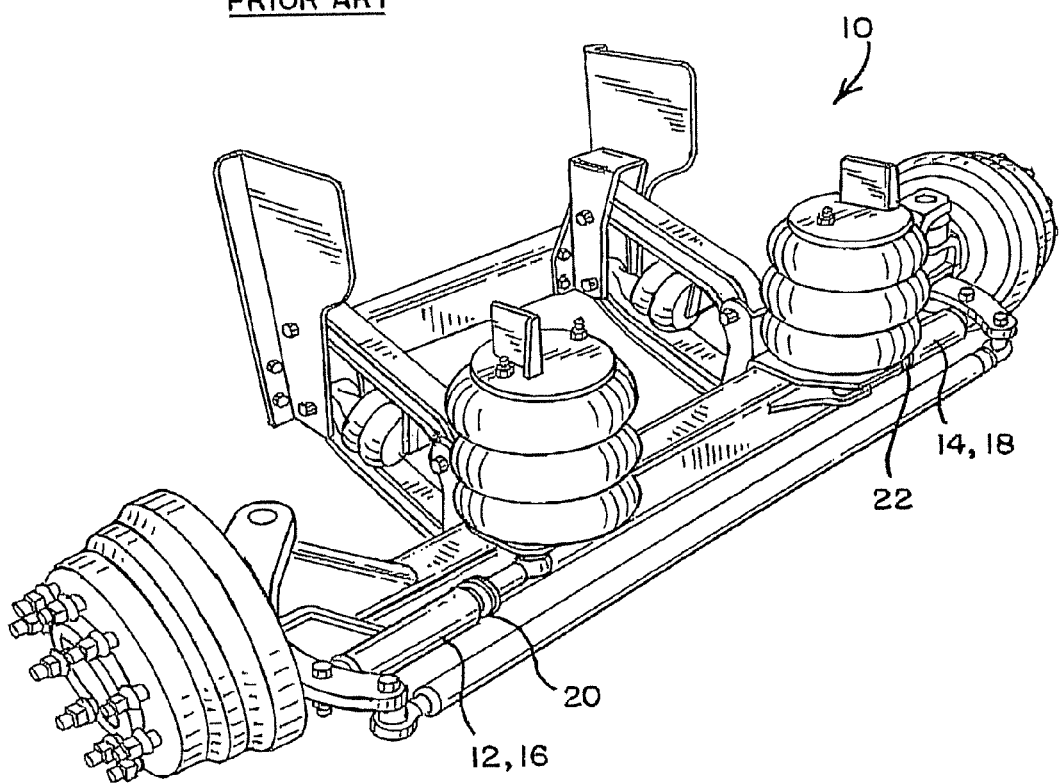
FIG. 1 is a perspective view of a self-steering axle suspension system using conventional linear stabilizers.
Figure 2A:
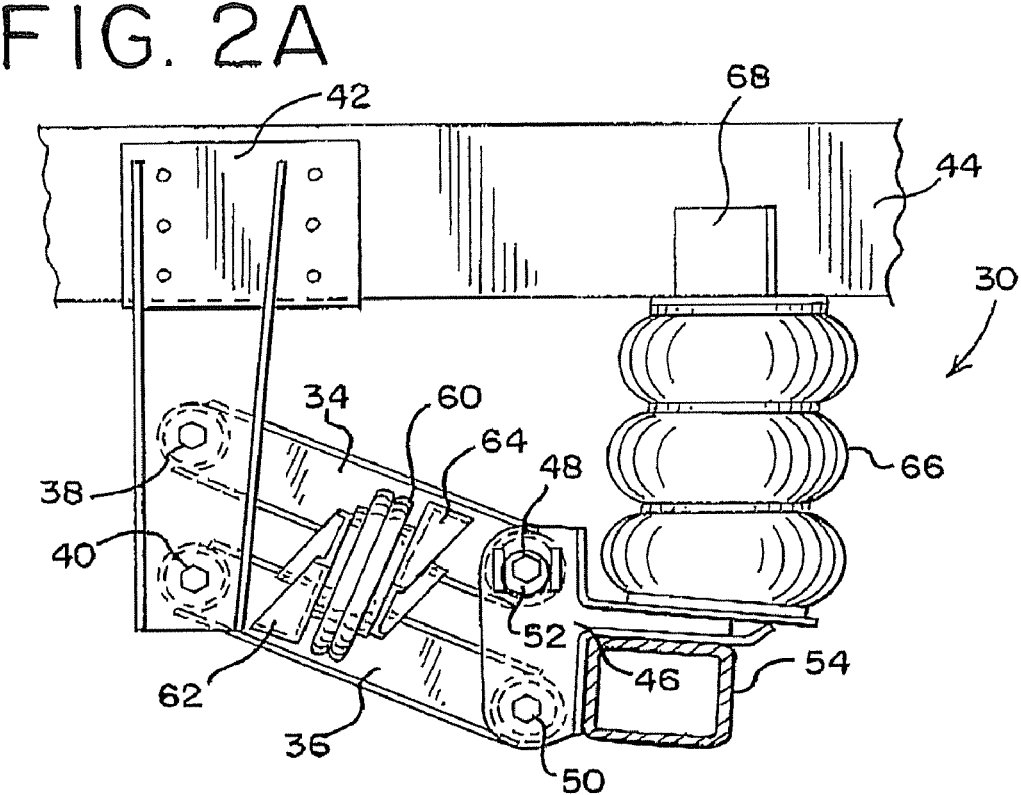
FIG. 2A is an elevational view of a self-steering liftable axle suspension system shown in its ground engaging position.
Figure 2B:
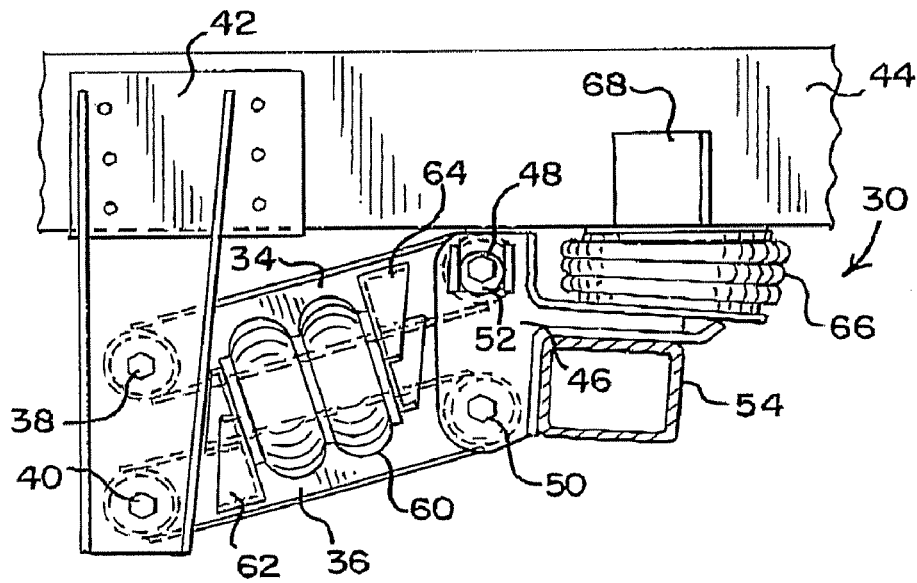
FIG. 2B is an elevational view of the same self-steering liftable axle suspension system shown in its lifted position.

FIGS. 2A, 2B and 3 illustrate a self-steering axle suspension system generally indicated by reference numeral 30. The illustrated self-steering axle suspension system 30 is a self-steering auxiliary lift-axle type of suspension system having a parallelogram, trailing arm geometry. The axle suspension system 30 is preferably a relatively lightweight suspension designed to permit compliance with any applicable bridge weight and stress regulations, such as the Federal Bridge Formula associated with relevant laws and regulations applicable within the United States of America.

While suspension system 30 is described as having these additional features, it will be appreciated that the present invention applies to all self-steering axle suspension systems for wheeled vehicles.

The suspension 30 illustrated in the figures is representative of an embodiment of the steerable, wheel-bearing lift axle suspension systems disclosed in U.S. Pat. No. 5,403,031 and U.S. Pat. No. 5,620,194. The entire disclosure of U.S. Pat. No. 5,403,031 and the entire disclosure of U.S. Pat. No. 5,620,194 are hereby incorporated herein by reference.

With respect to suspension system 30, the majority of the components positioned on one side of the vehicle will have correspondingly similar components positioned on the other side. Accordingly, in this description, when reference is made to a particular suspension component, it will be understood that a similar component is present on the opposite side of the vehicle, unless otherwise apparent. It will be appreciated that like elements are duplicated on opposite sides of the vehicle centerline.

As shown, suspension system 30 includes a pair of longitudinally extending parallel beams 34, 36 on each side of the vehicle, preferably constructed as cast aluminum beams. Beams 34, 36 are pivotally connected at their forward ends in known manner by pivots 38, 40 to a side rail frame hanger bracket 42 which, in turn, is fastened to a longitudinal frame member 44 for the vehicle. Frame member 44 extends longitudinally and preferably has a C-shaped cross-section in conventional manner.

Parallel beams 34, 36 are also pivotally connected at their rearward ends to an axle seat 46 by pivots 48, 50. Pivot 48 preferably includes an eccentric cam 52 designed to permit adjustment of the caster angle, permitting self-steering operation of the suspension system. Adjustment of the caster angle is made by turning eccentric cam 52 the requisite amount. The adjustable caster angle is typically oriented within the range of about positive three degrees to positive six degrees from the king pin centerline.

Axle seat 46 is mounted onto a laterally extending fabricated axle 54 having a hollow axle body 56 and gooseneck portions 58 on each end of the axle body (see FIG. 3). An inline lift air spring 60 is mounted to beams 34, 36 through brackets 62, 64, which in turn are fastened to beams 34, 36. A vertical ride air spring 66 is mounted on axle seat 46 and connected to frame member 44 through upper air spring bracket 68.

Steering knuckles 70 are rotatably mounted on opposite ends of the axle 54 by king pin assemblies (not shown) in known manner. King pins are used to mount the steering knuckles to the axle at 71, as shown in FIG. 3. Each steering knuckle 70 includes a steering arm 72, and a laterally extending tie rod 74 links the steering arms 72 of the steering knuckles 70 mounted on opposite sides of the vehicle.

Figure 6:
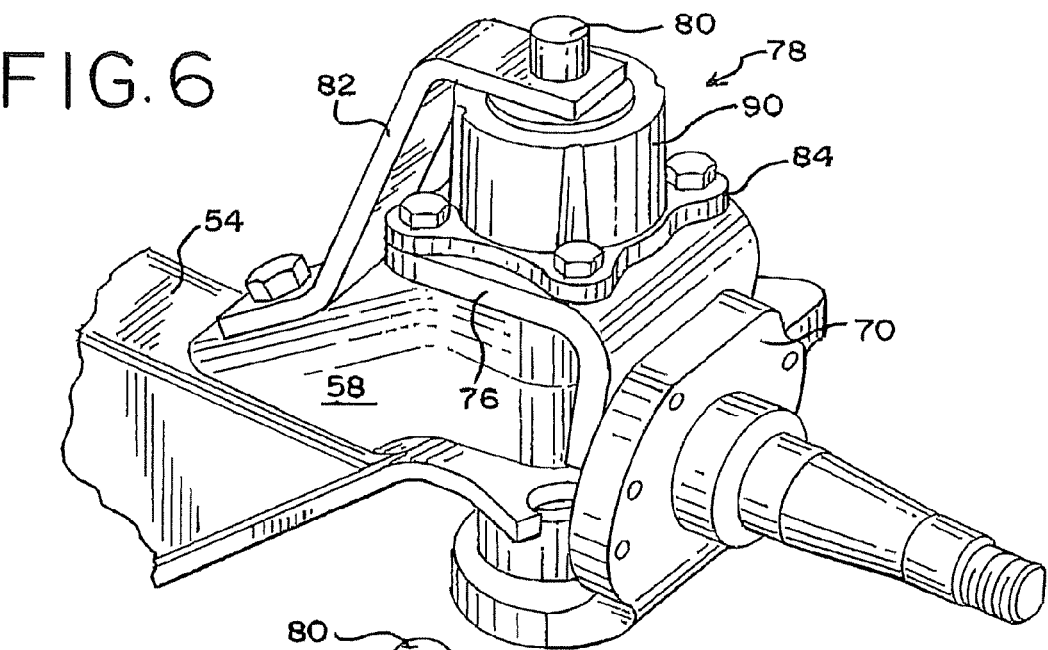
FIG. 6 is a perspective view of a portion of the self-steering axle suspension system shown in FIG. 2.

Referring to FIGS. 3 and 6, at least one of the steering knuckles 70 includes an upper plate 76 for mounting a rotary stabilizer 78 used to control the steerability of the suspension system. The rotary stabilizer 78 is preferably mounted on the upper plate 76 of the steering knuckle 70 by bolts or similar fasteners. The stabilizer 78 includes a central shaft 80 that preferably is coaxially aligned with the king pin used for mounting its adjacent steering knuckle 70 to that end of the axle 54. The shaft 80 is fixedly connected to the axle 54, preferably by a bracket 82 secured thereto and preferably secured to the gooseneck portion 58 of the axle 54.

When one rotary stabilizer 78 is used (as shown), total weight and cost are minimized. When a rotary stabilizer is mounted on each side of the axle beam, size per stabilizer is minimized, translating into better packaging.

FIG. 2A illustrates suspension 30 in its lowered or ground-engaging position, as opposed to its lifted or raised position, which is illustrated in FIG. 2B. Raising and lowering of suspension 30 is accomplished by the expansion and contraction of the inline lift air springs 60 and the vertical ride air spring 66. By expanding the vertical air spring 66 and exhausting the inline air springs 60, the wheels are lowered into engagement with the ground surface, which is shown in FIG. 2A. By expanding inline air springs 60 and exhausting vertical air spring 66, the wheels are lifted from engagement with the road surface, which is shown in FIG. 2B. The control of fluid in the air springs 60, 66 for accomplishing the lifting and lowering of the wheels is conventional and well known in the art.

Referring to FIG. 4, rotary stabilizer 78 includes a mounting base 84 having a generally planar construction. Mounting base 84 preferably has a generally round shape with the addition of ear-like protrusions 86 spaced approximately ninety degrees from adjacent protrusions 86. A mounting bore 88 is preferably machined within each protrusion 86 to permit the rotary stabilizer 78 to be mounted to the upper plate 76 of the steering knuckle 70 by appropriate fasteners (see FIG. 3).

The rotary stabilizer 78 includes a housing 90. Shaft 80 is positioned within housing 90 and extends axially in relation thereto. A portion of shaft 80 extends axially out of housing 90 and is exposed from the housing, as shown. The housing is generally cylindrical and preferably forms a unitary construction with mounting base 84 of stabilizer 78. The mounting base 84 and the housing 90 are together rotatably maneuverable about the shaft 80, as further described.

Referring to FIG. 5, as shown, the housing 90 of the rotary stabilizer 78 is partitioned into two or more fixed volume chambers 92A, 92B sized to accommodate the wheel cut specifications for the self-steering axle suspension system 30 in both directions. The wheel cut specification for the self-steering axle suspension system 30 illustrated in FIG. 3 is twenty-eight degrees. Under such circumstances, the chambers 92A, 92B illustrated in FIG. 5 preferably are sized to include an arc angle of about sixty degrees. Chamber 92A serves as a fluid reservoir for viscous material such as an incompressible hydraulic fluid, and its boundaries are defined by radially extending walls within housing 90 and the top and bottom walls of the housing. It will be appreciated that the top surface of the mounting base 84 for the stabilizer 78 may serve as the bottom wall of the housing 90 for this purpose.

As further shown, panes 96A, 96B are preferably associated with chambers 92A, 92B, respectively, and partition each such chamber into two variable volume sub-chambers. The sum of the variable volume sub-chambers for a particular chamber 92A, 92B is equal to the total volume of the chamber.

Each pane 96A, 96B preferably projects radially from the shaft 80 and preferably bisects the arc angle for its associated chamber 92A, 92B when the suspension system is in its resting (centered) position. The panes 96A, 96B may be formed with the shaft 80 as a unitary component, or alternatively may be secured to the shaft 80 by appropriate means. Pane 96A includes orifices 100 to provide for a fluid flow path during steering of the suspension system 30, which controls the steerability of the suspension system. Pane 96B may or may not include orifices, as desired.

As further shown, rotary stabilizer 78 also preferably includes resilient members 102 used for self-centering. Resilient members 102 may be formed with an elastomer-type material. For illustrative purposes, resilient members 102 are shown as being rubber cushion inserts having orifices or holes to permit their expansion and compression. However, it will be appreciated that the resilient members may take a variety of forms, such as, for example, air bladders, coil springs, etc. In the illustrative embodiment, the rubber cushion inserts 102 are positioned under compression within chamber 92B on opposite sides of pane 96B.

Figure 7:
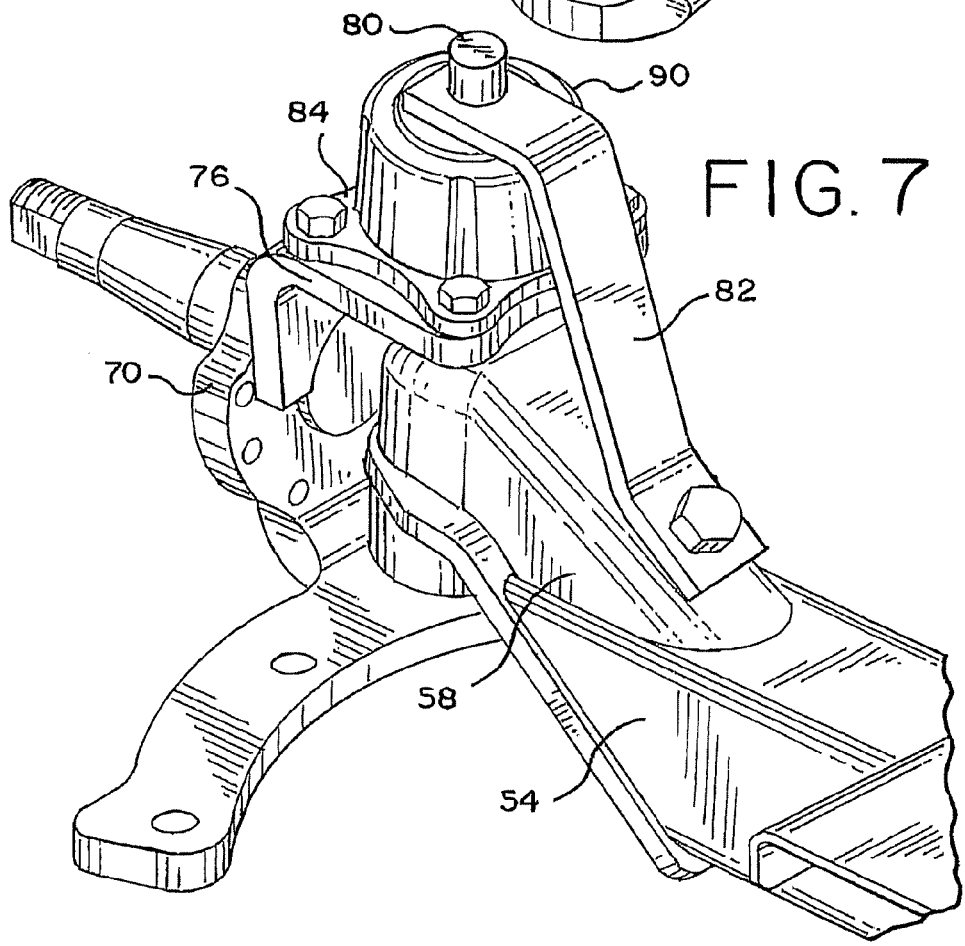
FIG. 7 is another perspective view of the portion of self-steering axle suspension system shown in FIG. 6.

Referring now to FIGS. 6 and 7, as shown, the mounting base 84 and housing 90 of the rotary stabilizer 78 are fixedly mounted to the steering knuckle 70, specifically to the upper plate 76 thereof. In addition, the shaft 80 of the rotary stabilizer 78 is fixedly mounted to the axle 54 through its bracket 82 (shown as being fastened to the gooseneck portion 58 of the axle 54) and is aligned with the king pin along its centerline.

In operation, when the vehicle corners, a force is imparted upon the self-steering axle suspension system 30, causing the suspension system to steer in the appropriate direction. At this time, the steering knuckles 70 rotate about their respective king pins. At least one of the linked steering knuckles 70 carries the mounting base 84 and the housing 90 of the rotary stabilizer 78. As the housing 90 of the stabilizer 78 rotates about its shaft 80, the volumes of the variable volume sub-chambers within fluid reservoir chamber 96A vary in accordance with the steering direction and cause the viscous fluid to flow through the orifices 100 of the radially extending pane 96A, which, with shaft 80 and pane 96B, remains stationary relative to the axle. In addition, during such steering action, one of the rubber cushion inserts 102 is also further compressed when its associated radially extending wall defining one of the boundaries of chamber 92B rotates with the housing towards the pane such that the wall presses against the insert. When this happens, the insert 102 is further compressed between that wall and pane 96B and its resilient nature tends to prevent further compression. As a result, there is additional control of the steerability of the system 30 by limiting free movement of the steering knuckles.

Upon straightening of the vehicle, however, the steering force imparted on the self-steering axle suspension system 30 is reduced to such an extent that the spring back force imparted on pane 96B by the force differential between the overly compressed rubber cushion insert 102 and the expanded (less compressed) rubber cushion insert 102 on the opposite side of pane 96B will overcome such steering force and cause the rotary stabilizer 78 to return to its resting (centered) position in a controlled manner due to the viscous fluid return flow through the orifices 100 of pane 96A.

It will be appreciated by those skilled in the art that the self-steering and self-centering of the rotary stabilizer used in the above illustrated embodiment of the present invention may be tuned by varying, for example, the size of the stabilizer, the size of the chambers, the number of pane orifices, the size of the pane orifices, the material and configuration of the resilient members, and the composition of the viscous material.

Figure 8:
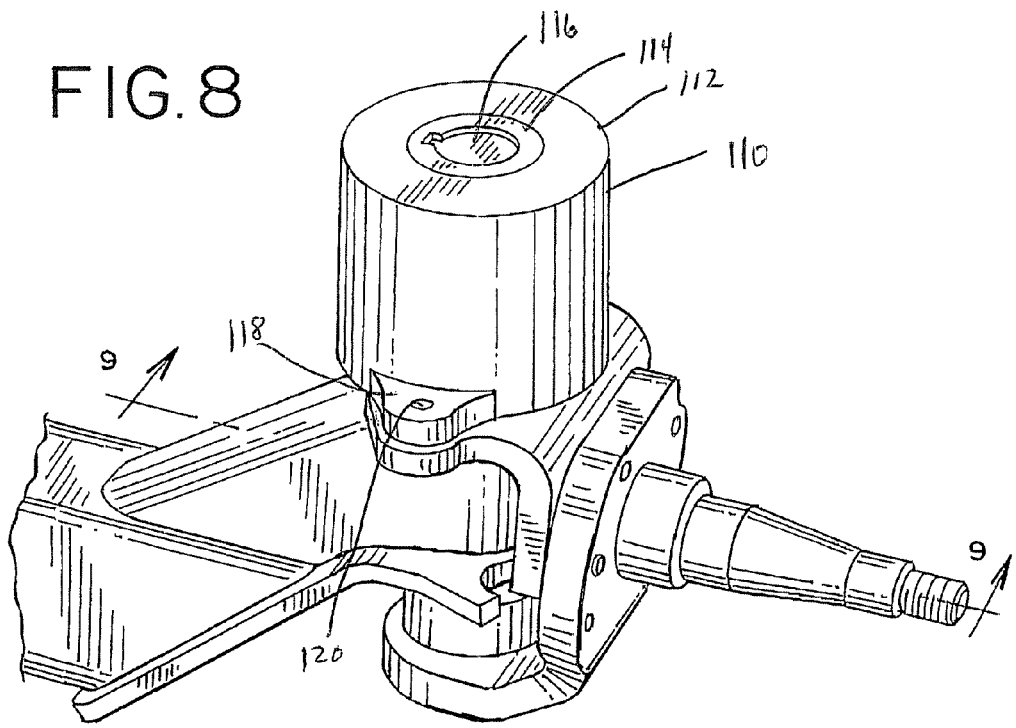
FIG. 8 is a perspective view of a portion of a self-steering axle suspension system having another embodiment of a rotary stabilizer designed in accordance with the principles of the present invention.
Figure 9:
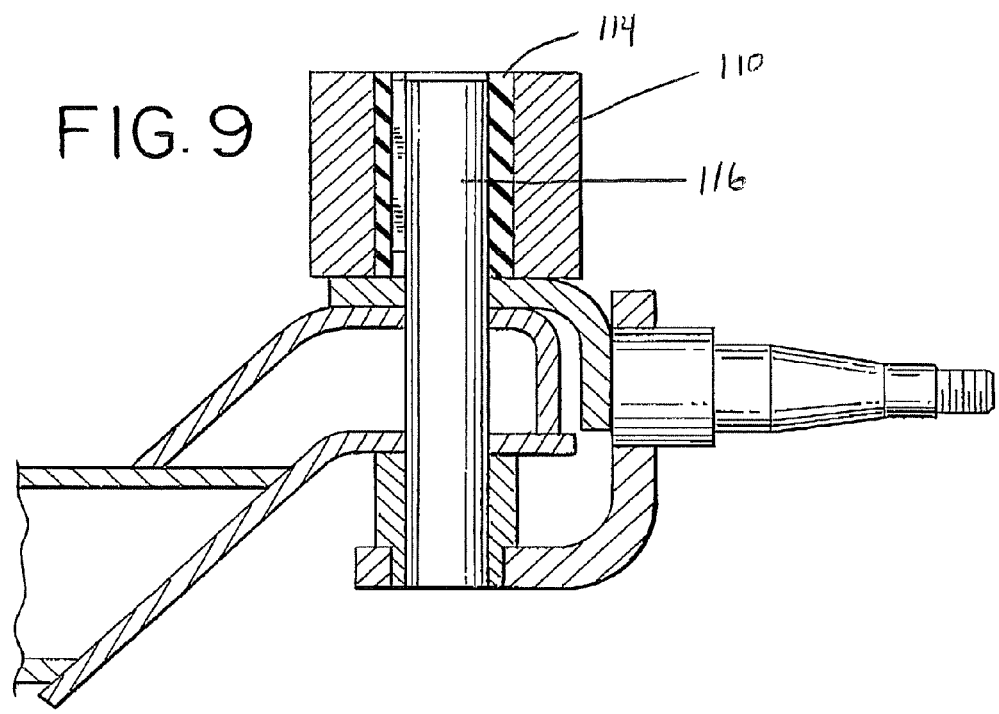
FIG. 9 is sectional view of the portion of the self-steering axle suspension system shown in FIG. 8 taken along line 9-9 thereof.

FIGS. 8-13 illustrate an alternative embodiment of a rotary stabilizer identified generally by reference numeral 110 shown mounted on the upper plate of a steering knuckle used in association with a self-steering axle suspension system. Rotary stabilizer 110 includes an outer housing element 112, an inner housing element 114 and a central shaft 116. The central shaft 116 is preferably keyed to the inner housing element 114. Central shaft 116 may be used as a king pin, as shown. The outer housing element 112 may include protrusions 118 (one of which is shown in FIG. 8). Each protrusion 118 may have a mounting bore 120 machined through it to permit mounting of rotary stabilizer 110 to an upper plate member of a steering knuckle, as shown. Viscous material 115 is contained in the space within outers housing element 112 and inner housing element 114. In preferred embodiments, the viscous material surrounds a rotor element extending radially from inner housing element.

In operation, when the vehicle corners, a force is imparted upon the self-steering axle suspension system, causing the suspension system to steer in the appropriate direction. At this time, the steering knuckles mounted on opposite ends of the axle rotate about their respective king pins, which in this preferred illustrated case at least one of which may be the central shaft 116, as shown. At least one of the linked steering knuckles carries the outer housing element 112 of the rotary stabilizer 110. As the outer housing element 112 rotates in relation to the inner housing element 114 and the keyed shaft 114, the viscous material 115 acts in shear to provide resistance to the rotary motion of the steering knuckle resulting in smooth motion and controlled steering of the self-steering axle suspension system.

Alternatively, any of several self-steering mechanisms may be used to cause the rotary stabilizer 110 to return to its resting (centered) position in a controlled manner, as desired. As one example, when the steering knuckle rotates about the king pin/central shaft, it may bear against a leaf spring having sufficient force to cause the steering knuckle to return to the resting position upon straightening of the vehicle.

It will be appreciated by those skilled in the art that while this invention has been described with reference to certain illustrative embodiments, it will be understood that this description shall not be construed in a limiting sense. Rather, various changes and modifications can be made to the described embodiments without departing from the true spirit and scope of the invention, as defined by the following claims. Furthermore, it will be appreciated that any such changes and modifications will be recognized by those skilled in the art as an equivalent to one or more elements of the following claims, and shall be covered by such claims to the fullest extent permitted by law.

The invention claimed is:

1. A steerable vehicle axle assembly, comprising:
    a vehicle axle having a first end and a second end;
    a first steering knuckle mounted to said vehicle axle at said first end by a first king pin;
    a second steering knuckle mounted to said vehicle axle at said second end by a second king pin;
    a tie rod connected between said first steering knuckle and said second steering knuckle; and
    a rotary stabilizer mounted to and seated on said first steering knuckle and axially aligned with said first king pin.

2. The steerable vehicle axle assembly as defined by claim 1 wherein said steerable vehicle axle assembly comprises a self-steering vehicle axle assembly.

3. The steerable vehicle axle assembly as defined by claim 1 wherein said steerable vehicle axle assembly comprises a liftable vehicle axle assembly.

4. The steerable vehicle axle assembly defined by claim 1 further comprising a second rotary stabilizer mounted to and seated on said second steering knuckle and axially aligned with said second king pin.

5. A steerable vehicle axle assembly, comprising:
    a vehicle axle having a first end and a second end;
    a first steering knuckle mounted to said vehicle axle at said first end by a first king pin;
    a second steering knuckle mounted to said vehicle axle at said second end by a second king pin;
    a tie rod connected between said first steering knuckle and said second steering knuckle;
    a rotary stabilizer mounted to and seated on said first steering knuckle and axially aligned with said first king pin; and
    wherein said first steering knuckle includes an upper mounting plate and wherein said rotary stabilizer is mounted to and seated on said upper mounting plate of said first steering knuckle.

6. The steerable vehicle axle assembly as defined by claim 5 wherein said rotary stabilizer includes mounting bores to permit said rotary stabilizer to be mounted to and seated on said upper mounting plate of said first steering knuckle.

7. The steerable vehicle axle assembly as defined by claim 6 wherein said rotary stabilizer includes a mounting base and said mounting bores are machined through said mounting base.

8. The steerable vehicle axle assembly as defined by claim 1 wherein said rotary stabilizer rotates with the first steering knuckle about an axis defined by the first king pin.

9. The steerable vehicle axle assembly as defined by claim 1 wherein said rotary stabilizer includes a housing and a central shaft disposed within said housing.

10. The steerable vehicle axle assembly as defined by claim 9 wherein said central shaft of said rotary stabilizer is axially aligned with said first king pin.

11. The steerable vehicle axle assembly as defined by claim 10 wherein at least part of said central shaft of said rotary stabilizer forms said first king pin.

12. The steerable vehicle axle assembly as defined by claim 9 wherein at least part of said central shaft of said rotary stabilizer forms said first king pin.

13. The steerable vehicle axle assembly as defined by claim 9 wherein said central shaft is fixedly attached to said vehicle axle.

14. The steerable vehicle axle assembly as defined by claim 9 wherein said rotary stabilizer includes a pane extending radially from said central shaft.

15. The steerable vehicle axle assembly as defined by claim 14 wherein said pane includes orifices machined through it.

16. The steerable vehicle axle assembly as defined by claim 15 wherein said rotary stabilizer includes a chamber containing viscous material.

17. The steerable vehicle axle assembly as defined by claim 16 wherein said chamber is sized to have an arc angle sufficient to accommodate a wheel cut specification for said assembly.

18. The steerable vehicle axle assembly as defined by claim 16 wherein said pane is positioned within said chamber containing said viscous material.

19. A steerable vehicle axle assembly, comprising:
    a vehicle axle having a first end and a second end;
    a first steering knuckle mounted to said vehicle axle at said first end by a first king pin;
    a second steering knuckle mounted to said vehicle axle at said second end by a second king pin;
    a tie rod connected between said first steering knuckle and said second steering knuckle;
    a rotary stabilizer mounted to and seated on said first steering knuckle and axially aligned with said first king pin; and
    a self-centering mechanism associated with said rotary stabilizer.

20. The steerable vehicle axle assembly as defined by claim 14 wherein said rotary stabilizer includes a second pane radially extending from said central shaft.

21. The steerable vehicle axle assembly as defined by claim 20 wherein said pane and said second pane extend in generally diametrically opposite directions.

22. The steerable vehicle axle assembly as defined by claim 14 wherein said rotary stabilizer includes a chamber and wherein said pane is positioned within said second chamber.

23. The steerable vehicle axle assembly as defined by claim 22 wherein said chamber is defined in part by a first side wall positioned on a first side of said pane and a second side wall positioned on a second side of said pane.

24. A steerable vehicle axle assembly, comprising:
    a vehicle axle having a first end and a second end;

a first steering knuckle mounted to said vehicle axle at said first end by a first king pin;

a second steering knuckle mounted to said vehicle axle at said second end by a second king pin;

a tie rod connected between said first steering knuckle and said second steering knuckle;

a rotary stabilizer mounted to and seated on said first steering knuckle and axially aligned with said first king pin: and wherein said rotary stabilizer includes a housing and a central shaft disposed within said housing;

wherein said rotary stabilizer includes a pane extending radially from said central shaft;

wherein said rotary stabilizer includes a chamber and wherein said pane is positioned within said second chamber;

wherein said chamber is defined in part by a first side wall positioned on a first side of said pane and a second side wall positioned on a second side of said pane; and wherein a first resilient member is positioned between said first resilient member is positioned between said first side wall and said first side of said pane and a second resilient member is positioned between said second side wall and said second side of said pane.

25. The steerable vehicle axle assembly as defined by claim 24 wherein said first resilient member is continuously under compression and said second resilient member is continuously under compression.

26. The steerable vehicle axle assembly as defined by claim 24 wherein said first resilient member comprises a first cushion insert and said second resilient member comprises a second cushion insert.

27. The steerable vehicle axle assembly as defined by claim 24 wherein said first resilient member includes orifices to facilitate expansion and compression thereof and said second resilient member includes orifices to facilitate expansion and compression thereof.

28. A rotary stabilizer comprising:

a housing;

a central shaft disposed within said housing;

a chamber defined in part by said housing;

a pane extending radially from said central shaft and positioned within said chamber, said pane having a first side and a second side;

said chamber being defined in further part by a first side wall thereof positioned on said first side of said pane and a second side wall thereof positioned on said second side of said pane; and a first resilient member positioned between said first side wall and said first side of said pane and a second resilient member positioned between said second side wall and said second side of said pane.

29. The rotary stabilizer as defined by claim 28 wherein said first resilient member is continuously under compression and said second resilient member is continuously under compression.

30. The rotary stabilizer as defined by claim 28 wherein said first resilient member comprises a first cushion insert and said second resilient member comprises a second cushion insert.

31. The rotary stabilizer as defined by claim 28 wherein said first resilient member includes orifices to facilitate expansion and compression thereof and said second resilient member includes orifices to facilitate expansion and compression thereof.

* * * * *